United States Patent [19]

Zehrung

[11] Patent Number: 5,586,895
[45] Date of Patent: Dec. 24, 1996

[54] POWER TRANSFER HINGE

[76] Inventor: Raymond E. Zehrung, 3029 Cameron Way, Santa Clara, Calif. 95051

[21] Appl. No.: 546,586

[22] Filed: Oct. 23, 1995

[51] Int. Cl.⁶ .................................................. H01R 35/04
[52] U.S. Cl. ............................................. 439/165; 16/223
[58] Field of Search ................................. 16/223; 439/31, 439/165

[56] References Cited

U.S. PATENT DOCUMENTS

| | | |
|---|---|---|
| 2,298,692 | 10/1942 | Giles . |
| 3,102,654 | 9/1963 | Millman et al. . |
| 3,103,398 | 9/1963 | Phelps . |
| 3,355,695 | 11/1967 | Overesch . |
| 3,428,738 | 2/1969 | Zychal . |
| 3,848,361 | 11/1974 | Foster et al. . |
| 3,857,625 | 12/1974 | Crane et al. ............................ 16/223 |
| 3,911,622 | 10/1975 | Prohaska . |
| 4,116,514 | 9/1978 | Lawrence ................................ 16/223 |
| 4,140,357 | 2/1979 | Wolz et al. ............................... 439/31 |
| 4,412,711 | 11/1983 | Suska . |
| 4,839,939 | 6/1989 | O'Brien, II . |
| 5,141,446 | 8/1992 | Ozouf et al. . |
| 5,329,433 | 7/1994 | Geeting et al. . |

*Primary Examiner*—Gary F. Paumen
*Attorney, Agent, or Firm*—David R. Gildea

[57] ABSTRACT

A hinge for transferring power between a wall jamb and a door. The hinge includes a pair of hinge leaves having interleaved knuckles axially aligned to share a common bore. The hinge pivots about upper and a lower pins disposed in the common bore. A coaxial cable enters a recess in a rear surface of one hinge leaf, passes through a longitudinal passageway in the hinge leaf, across the common bore, through a longitudinal passageway in the other hinge leaf, and exits a recess in the rear surface of the other hinge leaf. The passageways are aligned and have tapered openings to enable the cable to be routed after the hinge is mechanically assembled.

14 Claims, 2 Drawing Sheets

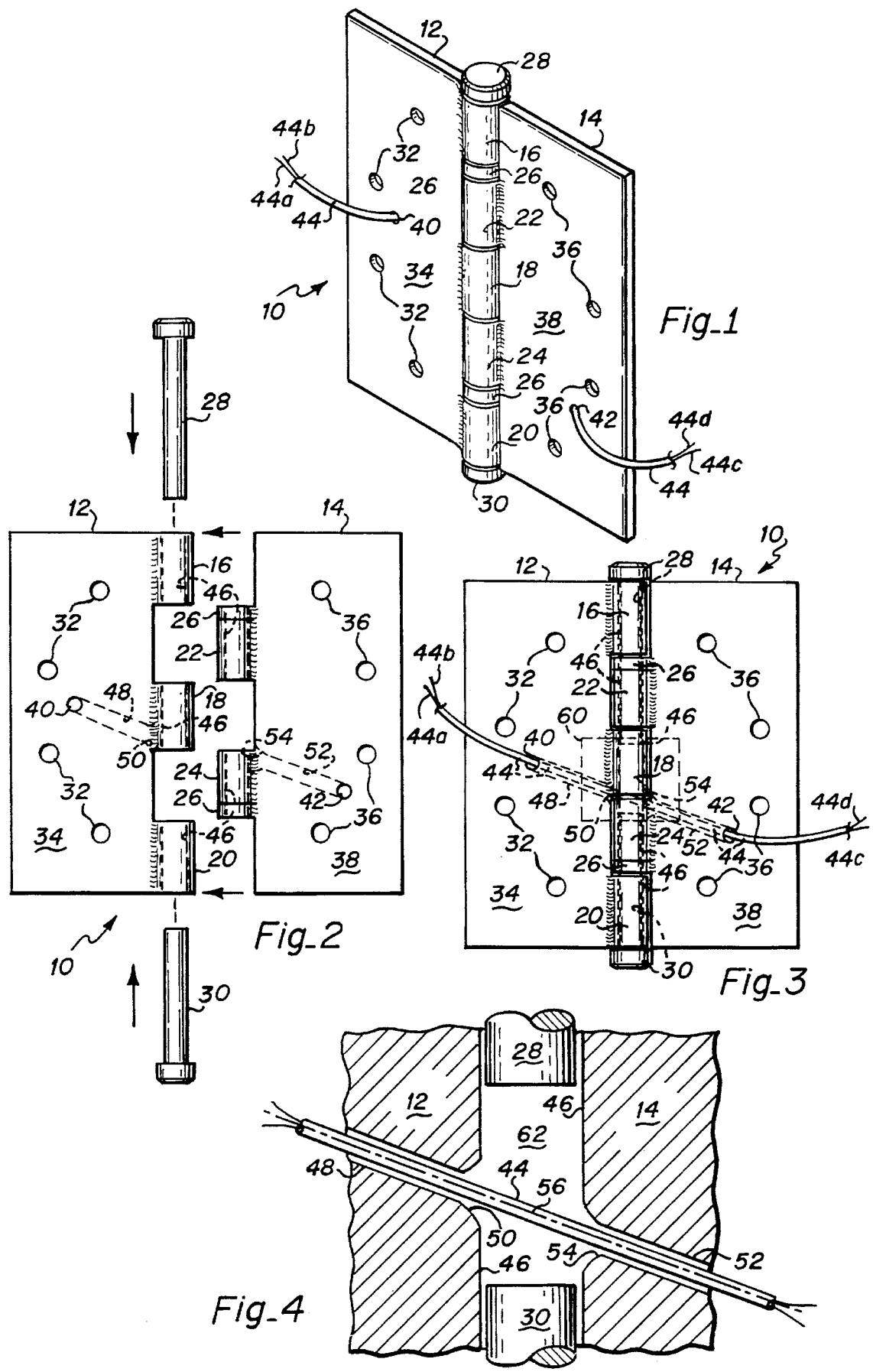

_5,586,895_

POWER TRANSFER HINGE

BACKGROUND OF THE INVENTION

1. Field of the Invention

The invention relates generally to hinges and more particularly to a door hinge for passing an electrical signal from a wall to a door.

2. Description of the Prior Art

A number of applications exist for a power transfer hinge to pass an electrical current from a wall to a pivotable door or window. Examples of such applications are electrically operated door locks, card-key door locks, door locks that automatically release the door in the event of a fire, door locks that are controllable from a remote location, and door-mounted lights. Several hinge constructions having wires for passing the electrical current have been tried. Preferably the wires are concealed within the hinge to be protected from damage or tampering and the hinge is load bearing to carry the weight of the door. In the known constructions having concealed wires, the wires are routed through longitudinal conduits in plate-like hinge leaves. One figure of merit for a power transfer hinge is the amount of electrical current that can be passed through the wires. However, because it is not desirable for the hinge leaves to be overly thick, the size of the wires in the cable and therefore the current that can be passed through the hinge is limited.

Zychal discloses a hinge for electrically connecting two housings in U.S. Pat. No. 3,428,738 entitled "hinge with conductors passing therethrough". The Zychal hinge comprises a U-shaped hinge plate and an inner hinge plate disposed longitudinally within the U. A wire cable is routed from recesses in each leg of the U-shaped plate to a recess in the inner plate through a longitudinal channel along an axis about which pivoting occurs. The housings are structurally connected for pivoting by two separate load-bearing hinges. Zychal does not teach the details of a load bearing hinge and the Zychal hinge is not intended or suitable for supporting a door.

Crane et al. in U.S. Pat. No. 3,857,625, Suska in U.S. Pat. No. 4,412,711, and O'Brien, II in U.S. Pat. No. 4,839,939 disclose hinges having wires entering an opening in the rear of a first hinge leaf, passing through a longitudinal conduit in the first leaf, passing upwardly or downwardly through bores in knuckles of the first and a second hinge leaf along the pivot axis of the hinge, passing through a second longitudinal conduit in the second hinge leaf, and exiting out an opening in the second hinge leaf. Unlike, Zychal, each of these hinges is intended to be load bearing, however, the constructions require several specialized parts and machining operations and are relatively complex and costly compared to a standard door hinge. Further, the hinges must be partially or entirely disassembled to insert or remove the wires, thereby making the hinge more difficult to repair if a wire breaks.

Several commercial products are available that comprise a standard door hinge that has been modified to pass a wire cable upwardly or downwardly through the bores of the hinge knuckles and outwardly through longitudinal passageways in the hinge leaves. The wire cable then exits to the door jam and wall jamb through recesses in the rear of the hinge leaves. The longitudinal passageways are gun drilled from the outside edge of the hinge leaves through the recesses to the bores of the hinge knuckles. Two conducting wires are required in order to make a complete electrical circuit for an electrical application device in the door. However, four wires are typically used to more closely approximate a circular cross-section of the longitudinal passageways to increase the amount of electrical current that can be carried and to facilitate the routing of the wire cable. For a commercial application, these products have the potential benefits being easy to install because they fit a standard door and wall jamb and of low cost due to the high manufacturing volume of the standard door hinges. However, all known commercial products require expensive machining operations for modifying the standard hinges and must be disassembled to replace the wire cable if the wires break.

There is a need for a load-bearing power transfer hinge that uses a concealed electrical cable for passing electricity from a wall to a door that carries the maximum electrical current, is relatively simple and inexpensive to construct, and can be repaired without disassembly.

SUMMARY OF THE INVENTION

It is therefore an object of the present invention to provide a load-bearing power transfer hinge that is simple and inexpensive to construct that uses a concealed electrical cable for passing electrical current from a wall to a door.

Another object is to provide a power transfer hinge using a coaxial electrical cable for increasing the amount of electrical current that can be passed through a power transfer hinge.

Another object is to provide a power transfer hinge having longitudinal passageways having a common center line and tapered openings through a common bore about which the hinge pivots in order to allow a cable to be fished without mechanically disassembling the hinge.

Another object is to provide a power transfer hinge having the shortest longitudinal passageways for a standard location for entry recesses in the hinge, thereby is simplifying an operation for constructing the passageways.

Briefly, in a preferred embodiment, the power transfer hinge includes a first hinge leaf having two or more first knuckles and a second hinge leaf having two or more second knuckles interleaved with the first knuckles and axially aligned to share a common bore. The power transfer hinge pivots about an upper and a lower pin disposed in the common bore. The first hinge leaf and the second hinge leaf have a rear entry recess and longitudinal passageway. A coaxial electrical cable enters one recess; passes through one passageway, the common bore, and the other passageway; and exits the other recess. The passageways share a common line and have tapered openings into the common bore to facilitate routing the cable after the hinge is mechanically assembled.

An advantage of the present invention is that the power transfer hinge has a low manufacturing cost because its construction uses simple and inexpensive manufacturing operations.

Another advantage of the present invention is that the power transfer hinge uses a coaxial electrical cable, thereby increasing the electrical current that can be passed without enlarging the diameter of the longitudinal passageways in the hinge leaves.

Another advantage of the present invention is that the cable in the power transfer hinge is routed through passageways that have a common center line and tapered openings through a common bore about which the hinge pivots, thereby allowing a cable to be fished without mechanically disassembling the hinge.

Another advantage of the present invention is that the passageways in the power transfer hinge are as short as possible for a standard door preparation, thereby simplifying construction and reducing the likelihood that a passageways will break one of the surfaces of the hinge leaves.

These and other objects and advantages of the present invention will no doubt become obvious to those of ordinary skill in the art after having read the following detailed description of the preferred embodiments which are illustrated in the various figures.

IN THE DRAWINGS

FIG. 1 is a three dimensional rear view of a power transfer hinge of the present invention;

FIG. 2 is an exploded view of the hinge of FIG. 1;

FIG. 3 is an assembled view of the hinge of FIG. 1;

FIG. 4 is a cross-sectional view of an expanded portion of the assembled view of the hinge of FIG. 3.

DETAILED DESCRIPTION OF THE PREFERRED EMBODIMENTS

Figure 5:
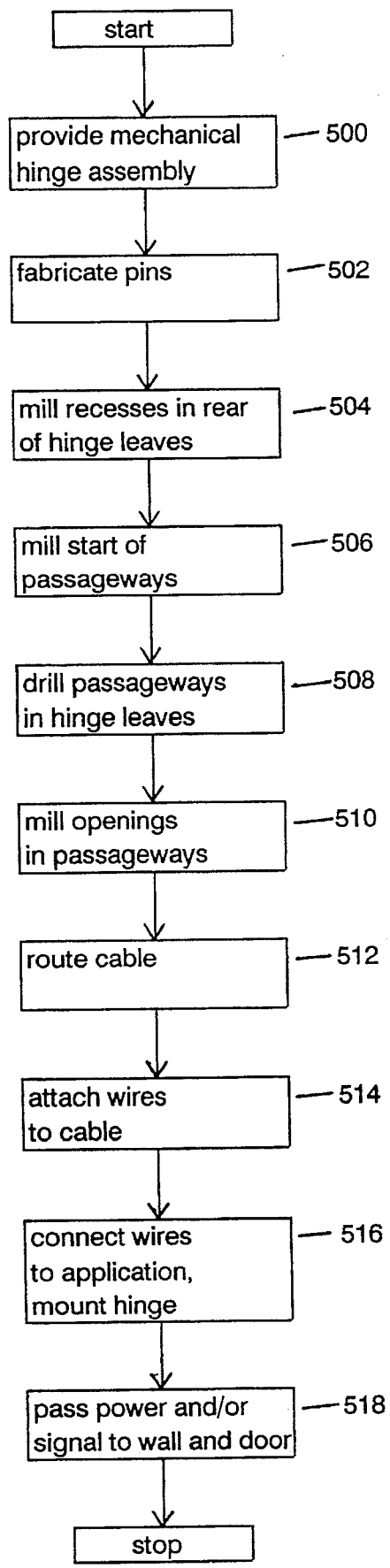
FIG. 5 is a method for constructing the hinge of FIGS. 1–4 for carrying an electrical current from a wall to a door.

FIG. 1 illustrates a three dimensional view of the rear side of the power transfer hinge of the present invention referred to herein by the general reference number 10. The hinge 10 includes a first hinge leaf 12 including a first upper knuckle 16, a first middle knuckle 18, and a first lower knuckle 20; and a second hinge leaf 14 including a second upper knuckle 22 and a second lower knuckle 24. The second upper knuckle 22 is interleaved between the first upper knuckle 16 and the first middle knuckle 18 and the second lower knuckle 24 is interleaved between the first middle knuckle 18 and the first lower knuckle 20. In a preferred embodiment, an upper portion of the second upper knuckle 22 and a lower portion of the second lower knuckle 24 include a ball race 26. An upper pin 28 having an enlarged head extends downwardly through a bore in the first upper knuckle 16 and a lower pin 30 having an enlarged head extends upwardly through a bore in the first lower knuckle 20. The upper pin 28 and the lower pin 30 are staked to is the first upper knuckle 16 and the first lower knuckle 20, respectively. In operation, the first and second hinge leaves 12 and 14 pivot about the vertical axis of the upper and lower pins 28 and 30. Fastening holes 32 are used for fastening the rear surface 34 of the first hinge leaf 12 to a door or wall jamb. Similarly, fastening holes 36 are used for fastening the rear surface 38 of the second hinge leaf 14 to an opposed door or wall jamb. The hinge 10 may be used in any orientation including vertically with the upper pin 28 up, vertically with the upper pin 28 down, horizontally, or at an angle. Although a preferred embodiment has five knuckles 16, 18, 20, 22, and 24, a number of knuckles of four or more may be used.

The rear surface 34 of the first hinge leaf 12 includes a recess 40. Similarly, the rear surface 38 of the second hinge leaf 14 includes a recess 42. A cable 44 exits the hinge 10 at the recess 40 and at the recess 42. In a preferred embodiment, the recess 40 is located to mate with a standard door preparation known as "Stanley" and the recess 42 is located to mate with another standard door preparation known as "McKinney." The cable 44 is an electrical coaxial cable 44 having inner and outer conductors. Optionally, the inner and outer conductors are electrically connected to wires 44a, 44b, 44c, and 44d in order to connect into an electrical system. Alternatively, the cable 44 may comprise one or more separate electrical wires and/or optical conductors.

FIG. 2 illustrates an exploded rear view of the power transfer hinge 10 showing the first hinge leaf 12 including the rear surface 34 and the fastening holes 32 and the second leaf 14 showing the rear surface 38 and the fastening holes 36. Each of the knuckles 16, 18, 20, 22, and 24 includes a knuckle bore. When the hinge 10 is assembled, each of the knuckle bores is axially aligned to form a common bore 46. The upper pin 28 inserts through the bores of the first upper knuckle 16 and the second upper knuckle 22 and part way into the bore of the first middle knuckle 18 and the lower pin 30 inserts through the bore of the first lower knuckle 20 and part way into the bore of the second lower knuckle 24. A first longitudinal passageway 48 enters the common bore 46 through a tapered opening 50 and connects the common bore 46 to the recess 40. Similarly, a second longitudinal passageway 52 having a tapered opening 54 connects the common bore 46 to the recess 42. The first and second passageways 48 and 52 are made so that their entries into the common bore 46 have a common center line 56 (FIG. 4) when the hinge 10 is assembled.

FIG. 3 illustrates a rear view of the power transfer hinge 10 after assembly, showing the first hinge leaf 12, the rear surface 34, the fastening holes 32, the second hinge leaf 14, the rear surface 38, and the fastening holes 36 as described in the detailed description accompanying the FIG. 2 above. The cable 44 is routed through the recess 40, the first passageway 48, the first opening 50, the common bore 46, the second opening 54, the second passageway 52, and the recess 42. The wires 44a–d are attached after the cable is routed. If the cable 44 breaks within the hinge 10, a new cable 44 may be pushed or fished without mechanically disassembling the hinge 10 because the first and second passageways 48 and 52 are aligned and the openings 50 and 54 are tapered as they enter the common bore 46. An outline 60 outlines a portion of the hinge 10 that is illustrated in FIG. 4.

FIG. 4 illustrates an expanded cross-sectional rear view within the outline 60 (FIG. 3) of the hinge 10 after assembly. The common bore 46 includes a cavity 62 formed between the lower end of the upper pin 28 and the upper end of the lower pin 30. The entries of the first and second passageways 48 and 52 into the cavity 62 are aligned with the common center line 56 and the openings 50 and 54 are tapered to increase in diameter o as the passageways 48 and 52 enter the cavity 62. In a preferred embodiment, the hinge leaves 12 and 14 are approximately 0.125' thick, the passageways 48 and 52 are approximately 0.078 inches in diameter, the openings 50 and 54 taper out to a diameter of approximately 0.100 inches, and the cable 44 is 0.071 inches in diameter. It is preferred that the cable 44 be a coaxial electrical cable 44 because for a given insulation thickness, the round cross-section of a coaxial cable 44 provides more cross-sectional area within a round diameter passageway 48 and 52 than individual wires and therefore can carry more current. To facilitate routing, the inner conductor of the coaxial cable 44 is stranded and the outer conductor is braided for greater flexibility, and an outer insulating sleeve coated or made with Teflon. If required in the electrical system, both DC and AC may be simultaneously carried by the cable 44 and separated in the electrical system with a DC blocking capacitor.

FIG. 5 illustrates a preferred method for constructing the power transfer hinge 10. In a step 500, a mechanical hinge assembly such as a model BB5000 from Bommer of Landrun, S.C. a model FBB179 from Stanley Hardware division of The Stanley Works of New Britain, Conn., or a model from Precision Built Butts of Ontario, Calif. is obtained from the manufacturer or a hardware supplier and disassembled. In a step 502 the upper and lower pins 28 and 30 are made from the hinge obtained in the step 500 or fabricated. In a step 504, the recesses 40 and 42 are milled. If desired the recesses 40 and 42 may be located for a Stanley and a McKinney door preparation, respectively. By reversing the upward direction of the hinge 10, either the Stanley or the McKinney door preparation may be used on the door jamb. Typically, the wall jamb does not have a standard preparation. In a step 506, the passageways 48 and 52 are started with an end mill in order to avoid slipping against the interior surface of the common bore 46. In a step 508, the passageways 48 and 52 are drilled with an ordinary drill bit to connect to the recesses 40 and 42, respectively. In a step 510, the openings 50 and 54 are milled with a tapered mill. Alternatively, the passageways 48 and 52 and the openings 50 and 54 may be drilled with a special drill bit having a tapered shoulder. In a step 512, the cable 44 is routed through the passageways 48 and 52 and the hinge 10 is assembled. In a step 514, the wires 44*a–d* are connected to the cable 44. In a step 516, the wires 44*a–d* are connected for an electrical application and the hinge 10 is mounted for bearing the load of a door on a wall. In a step 518, the hinge 10 passes power and/or a signal between the wall and the door.

Although the present invention has been described in terms of the presently preferred embodiments, it is to be understood that such disclosure is not to be interpreted as limiting. Various alterations and modifications of the hinge 10 and the method for making the hinge 10 will no doubt become apparent to those skilled in the an after having read the above disclosure. Accordingly, it is intended that the appended claims be interpreted as covering all alterations and modifications as fall within the true spirit and scope of the invention.

What is claimed is:

1. A power transfer hinge comprising:
   a first hinge leaf having a first rear surface having a first recess and at least two first knuckles having bores axially aligned to a common bore;
   a second hinge leaf having a second rear surface having a second recess and at least two second knuckles, interleaved with said first knuckles, having bores axially aligned to said common bore;
   a pair of pins, disposed in said common bore, for pivotally engaging said first and second hinge leaves;
   a first passageway entering said common bore through a first opening and connecting said common bore to said first recess;
   a second passageway entering said common bore through a second opening and connecting said common bore to said second recess, the second passageway and the first passageway having a common center line for entering said common bore; and
   a cable passing through said first recess, the first passageway, said common bore, the second passageway, and the second recess.

2. The hinge of claim 1, wherein:
   the cable includes electrical conductors for carrying an electrical current.

3. The hinge of claim 1, wherein:
   the cable is a coaxial cable having an inner conductor for conducting an electrical current and an outer conductor for carrying an electrical current.

4. The hinge of claim 3, wherein:
   the cable includes an outer sleeve coated with Teflon.

5. The hinge of claim 1, wherein:
   the cable includes an optical conductor for carrying light.

6. The hinge of claim 1, wherein:
   said first and second openings are tapered to increase in diameter entering said common bore.

7. A method for constructing a hinge for transferring power comprising steps of:
   providing a hinge having a pair of hinge leaves having interleaved knuckles sharing a common bore, said hinge further having a pair of pins disposed in said common bore pivotally engaging said hinge leaves;
   making a recess in a rear surface of each said hinge leaf;
   making a longitudinal passageway with an opening into said common bore to connect said common bore to said recess in each said hinge leaf, each said passageway to share a common center line entering said common bore; and
   routing a cable to enter one said recess, pass through one said passageway, pass through said common bore, pass through the other said passageway, and exit the other said recess.

8. The method of claim 7, wherein:
   the step of making a longitudinal passageway includes a step of tapering said opening to increase in diameter as said common bore is entered from said passageway.

9. The method of claim 7, wherein:
   the step of making a longitudinal passageway includes a step of drilling said passageway from said common bore to said recess with a drill bit and milling a taper in said opening with a tapered mill.

10. The method of claim 7, wherein:
    the step of making a longitudinal passageway includes a step of drilling said passageway from said common bore to said recess and tapering said opening with a drill bit having a tapered shoulder for making said opening.

11. The method of claim 7, wherein:
    the step of routing a cable includes a step of routing said cable when said hinge leaves and said pins are mechanically assembled and without disassembling said hinge leaves from said pins.

12. A method of transferring power between a wall and a door, the method comprising steps of:
    providing a hinge having a pair of hinge leaves having interleaved knuckles sharing a common bore; a pair of pins disposed in said common bore pivotally engaging said hinge leaves; a recess in a rear surface of each said hinge leaf; a pair of longitudinal passageways having a common center line and an opening into said common bore to connect said common bore to said recesses, each of said hinge leaves having a respective one of said longitudinal passageways, a cable entering one said recess, passing through one said passageway, passing through said common bore, passing through the other said passageway, and exiting the other said recess; and
    mounting one said rear surface to the wall and the other said rear surface to the door.

13. The method of claim 12, further including a step of:
    passing electrical current through said cable.

14. The method of claim 12, further including a step of:
    passing optical energy through said cable.

\* \* \* \* \*